March 30, 1948. S. BAILLIE 2,438,774
CHUCK DEVICE, PARTICULARLY FOR COAL CUTTING MACHINES
Filed Feb. 8, 1946
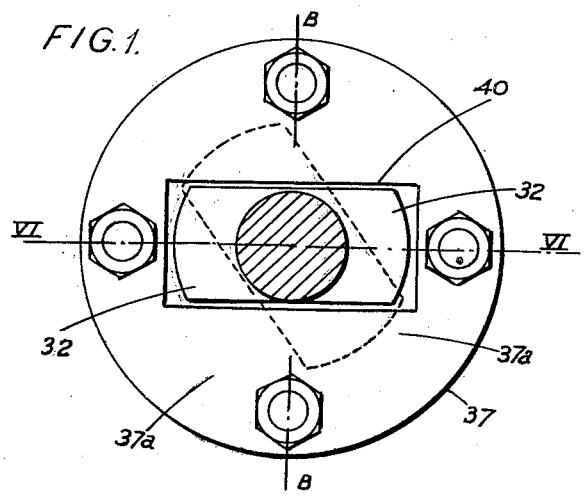
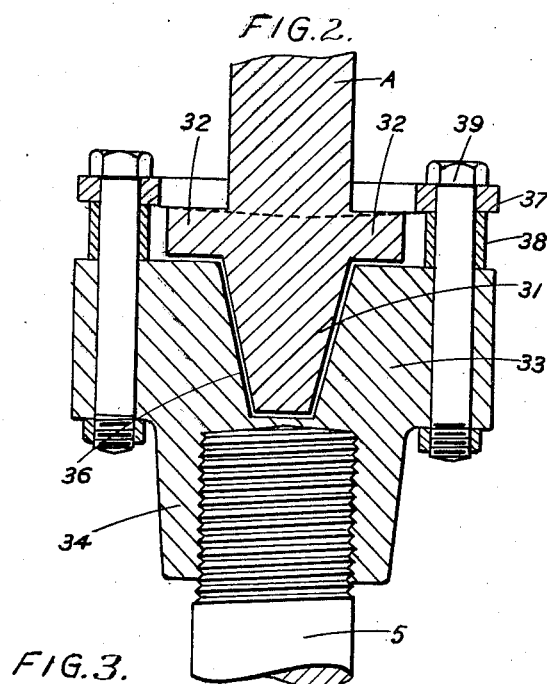
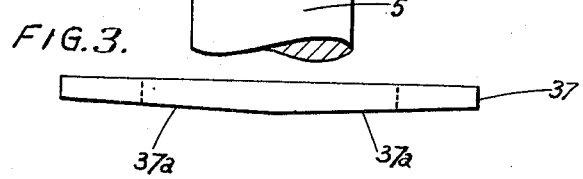
INVENTOR:
SAMUEL BAILLIE Patented Mar. 30, 1948

2,438,774

UNITED STATES PATENT OFFICE 2,438,774

CHUCK DEVICE, PARTICULARLY FOR COAL CUTTING MACHINES

Samuel Baillie, New Invention, Willenhall, England

Application February 8, 1946, Serial No. 646,421
In Great Britain April 5, 1945

2 Claims. (Cl. 279—93)

This invention relates to chucks for fixing a drill or pick to the driving spindle of coal cutting or like machines and has for its object simple means for rigidly securing the drill or pick while providing for its ready detachment.

Referring to the drawing:

Figure 1 is a face view of the chuck,

Figure 2 is a section on line VI—VI of Figure 1, and

Figure 3 is a side elevation of a part detached from the chuck.

According to the invention a chuck is fitted on the shaft 5 and is adapted to grip a pick head or similar tool A having a rear conical portion 31 and lateral projections 32 at the base of such conical portion. The body of the chuck comprises a cylindrical block having a boss 34 projecting from one face for screwing on the driving shaft 5. The cylindrical block has a conical bore 36, the large end of which is at the outer face of the block. A disc 37 is fixed to this latter face at a distance therefrom, conveniently by means of distance pieces or bosses 38, securing bolts or studs 39 passing through the disc and the distance pieces 38 into the cylindrical block. The inner face of this disc inclines from a line B—B diametrically thereacross to each opposite side of the disc, thereby forming two wedge or inclined flat surfaces 37a. A rectangular hole 40 passes through this disc at right angles to the said diametric line B—B where the disc is of the greater thickness. The head A of the pick having the lateral projections 32 is passed through the said slot 40 and the conical portion 31 engaged in the conical bore 36 of the block. The distance from tip to tip of the lateral projections 32 is greater than the width of the slot 40 at the narrowest part, and less than the width of the slot at the widest part. If now the pick is rotated, the lateral projections will wedge themselves on the tapering surfaces 37a on each side of the rectangular slot 40 and thus firmly hold the pick; the rotation of the pick, when driven, will tend to increase the wedging action and will also firmly press the tapering shank into the tapering bore of the body. The inclined faces 37a give a gradually increasing wedge action as the projections are turned from a position at right angles to the line B—B, as the angle of movement of the projections required to effect a unit of axial movement of the shank gradually reduces as the projections are turned. If the projections 32 are clear of the body of the chuck, the grip is taken by the tapering bore and the inclined faces of the disc and the drive will be taken by the grip of the conical end 31 in the conical recess 36.

Having thus described the invention, what is claimed as new and desired to be secured by Letters Patent is:

1. A chuck device comprising a chuck body having a conical recess therein, a tool having a tapering shank for entering said recess, lateral projections on diametrically opposite sides of the shank, a member off-set from the portion of the body of the chuck, said member having a slot through which said projections are adapted to pass so as to lie between said off-set member and said body of said chuck with the shank engaging said recess, and wedge surfaces formed on the surface of said off-set member facing said recess so that when said tool is rotated said tapering shank is wedged in said conical recess.

2. A chuck device comprising a chuck body having a conical recess therein, a tool provided with a tapering shank for entering said recess, lateral projections on diametrically opposite sides of said shank, a member off-set from the portion of said body of the chuck, said member having a slot therein through which said projections are adapted to pass so as to lie between said off-set member and said chuck body with the shank engaging said recess, and wedge surfaces formed on the face of said off-set member and positioned adjacent said recess, said wedge surfaces inclining in opposite directions from a line passing diametrically across the axis of said chuck whereby upon rotation of said shank said projections bear on said wedge surfaces and force said shank into said conical recess.

SAMUEL BAILLIE.

REFERENCES CITED

The following references are of record in the file of this patent:

UNITED STATES PATENTS

| Number | Name | Date |
|---|---|---|
| 1,270,231 | Stauft | June 18, 1918 |
| 1,430,102 | Nell | Sept. 26, 1922 |
| 1,760,354 | Gartin | May 27, 1930 |
| 2,396,365 | Feucht | Mar. 12, 1946 |

FOREIGN PATENTS

| Number | Country | Date |
|---|---|---|
| 184,817 | Great Britain | Aug. 31, 1922 |
| 39,378 | Germany | May 31, 1887 |